United States Patent [19]
Pelly

[11] Patent Number: 5,982,136
[45] Date of Patent: Nov. 9, 1999

[54] CIRCUIT FOR SENSING CURRENT IN POWER TRAINS FOR MOTOR CONTROL

[75] Inventor: Brian R. Pelly, Palos Verdes Estates, Calif.

[73] Assignee: International Rectifier Corporation, El Segundo, Calif.

[21] Appl. No.: 08/784,233

[22] Filed: Jan. 16, 1997

Related U.S. Application Data

[60] Provisional application No. 60/010,217, Jan. 18, 1996.

[51] Int. Cl.$^6$ ....................................................... H02P 5/34
[52] U.S. Cl. ............................................................ 318/801
[58] Field of Search ................................. 363/35, 37, 51, 363/34; 318/798–815

[56] References Cited

U.S. PATENT DOCUMENTS

| | | | |
|---|---|---|---|
| 4,521,840 | 6/1985 | Hoadley | 363/35 |
| 4,788,485 | 11/1988 | Kawagishi et al. | 318/811 |

*Primary Examiner*—Robert E. Nappi
*Assistant Examiner*—Kim Lockett
*Attorney, Agent, or Firm*—Ostrolenk, Faber, Gerb & Soffen, LLP

[57] ABSTRACT

The invention relates to a circuit and method for sensing inverter current in a motor drive power train for purposes of detecting overload and fault conditions, based on the use of simple low cost ac current transformers and/or a low cost current-viewing resistor with non-critical inductance characteristics. The invention employs a current-viewing resistor in the negative dc bus of the inverter and a current transformer, connected in series with the current-viewing resistor, which is coupled to detect the current in the smoothing capacitor of the inverter circuit. If a motor braking circuit is included, the voltage developed across the braking resistor is summed with the inverter current signal to obtain a signal indicative of the total current in the inverter circuit. In accordance with another embodiment, a respective current transformer is coupled to each leg of the ac input line and a further current transformer is coupled to sense the filter capacitor current. The positive components of the three phase ac input line signal are added in an operational amplifier to the capacitor to obtain the total inverter current, which can then be compared to a reference signal.

15 Claims, 9 Drawing Sheets

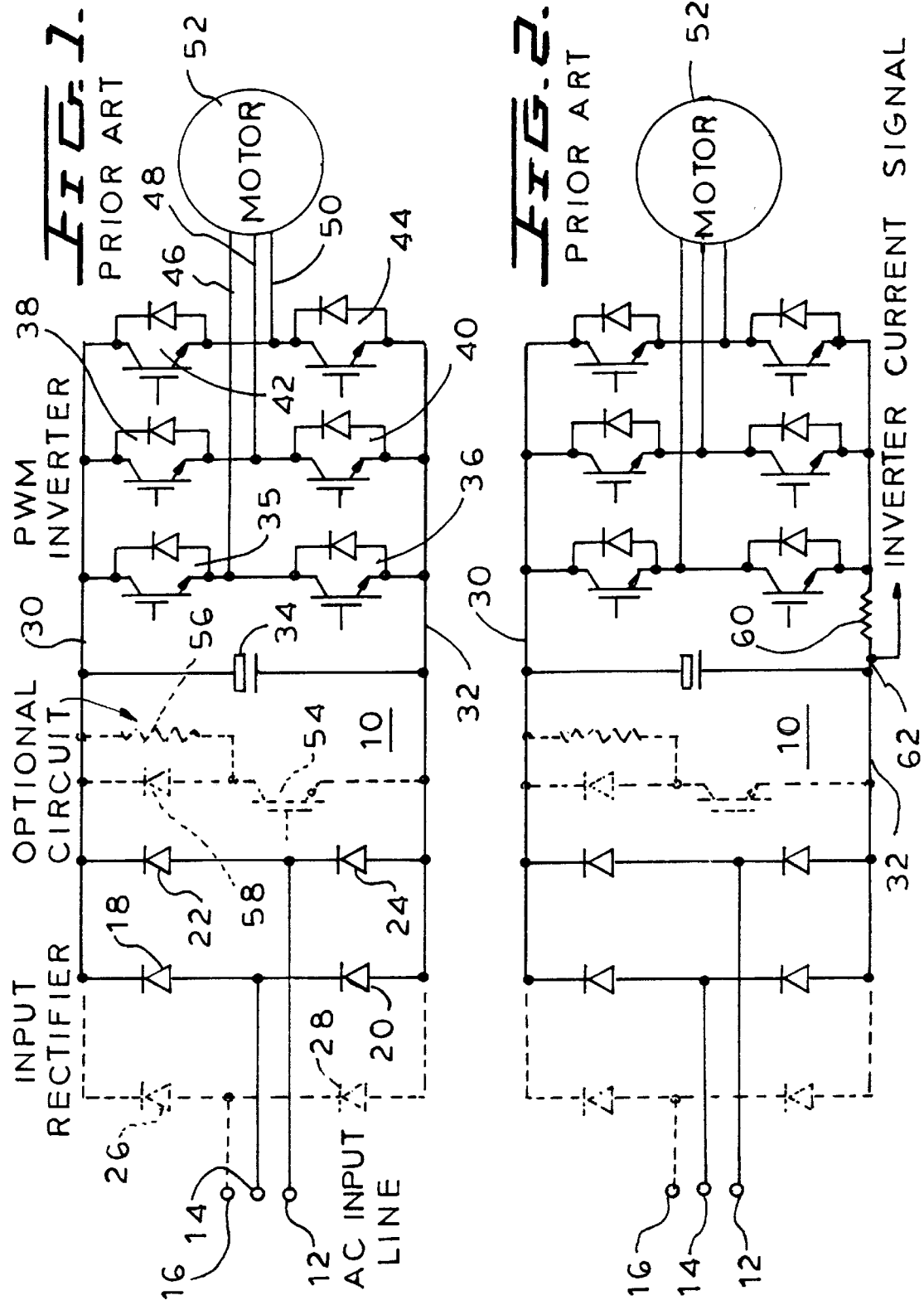

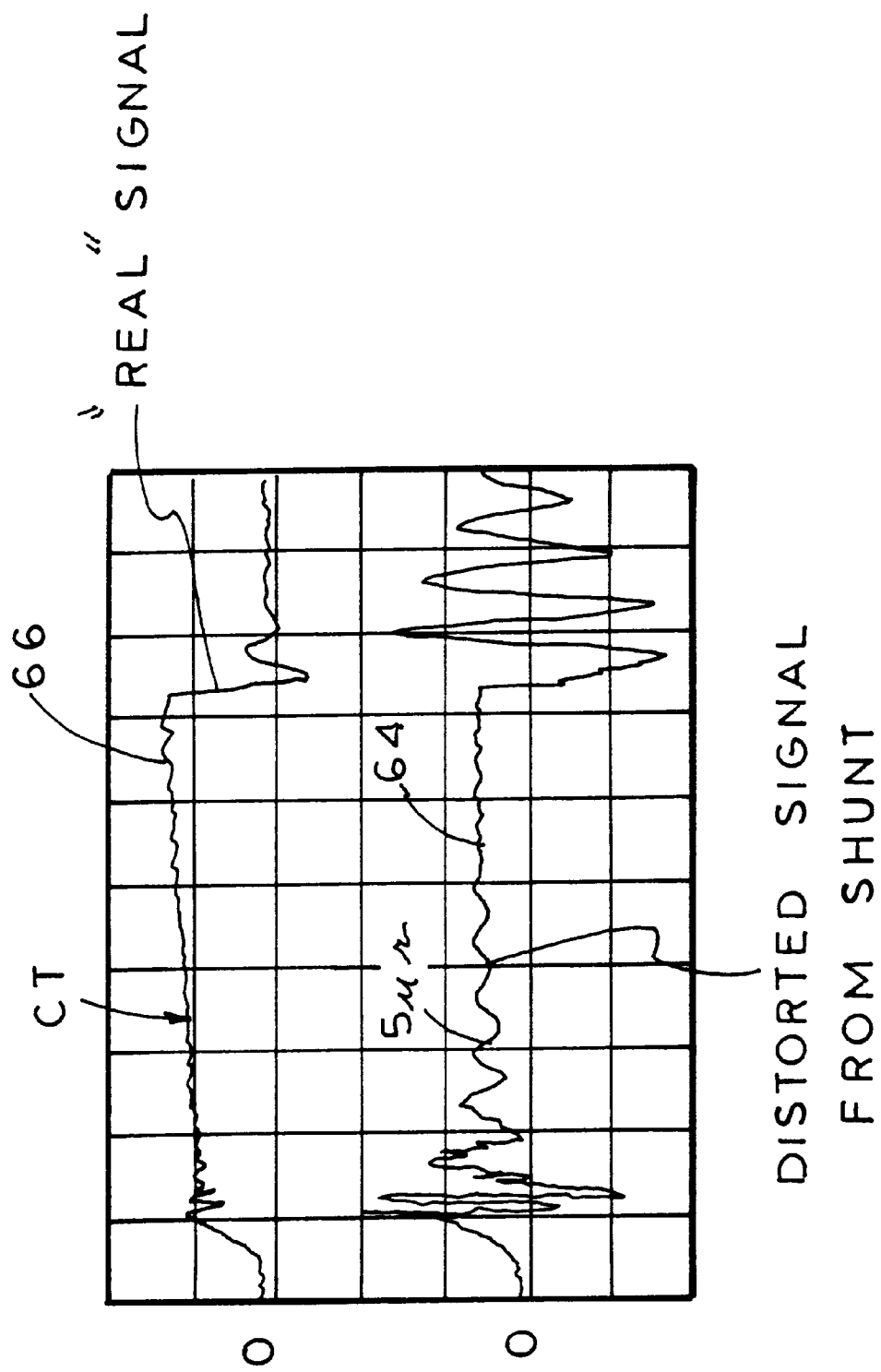

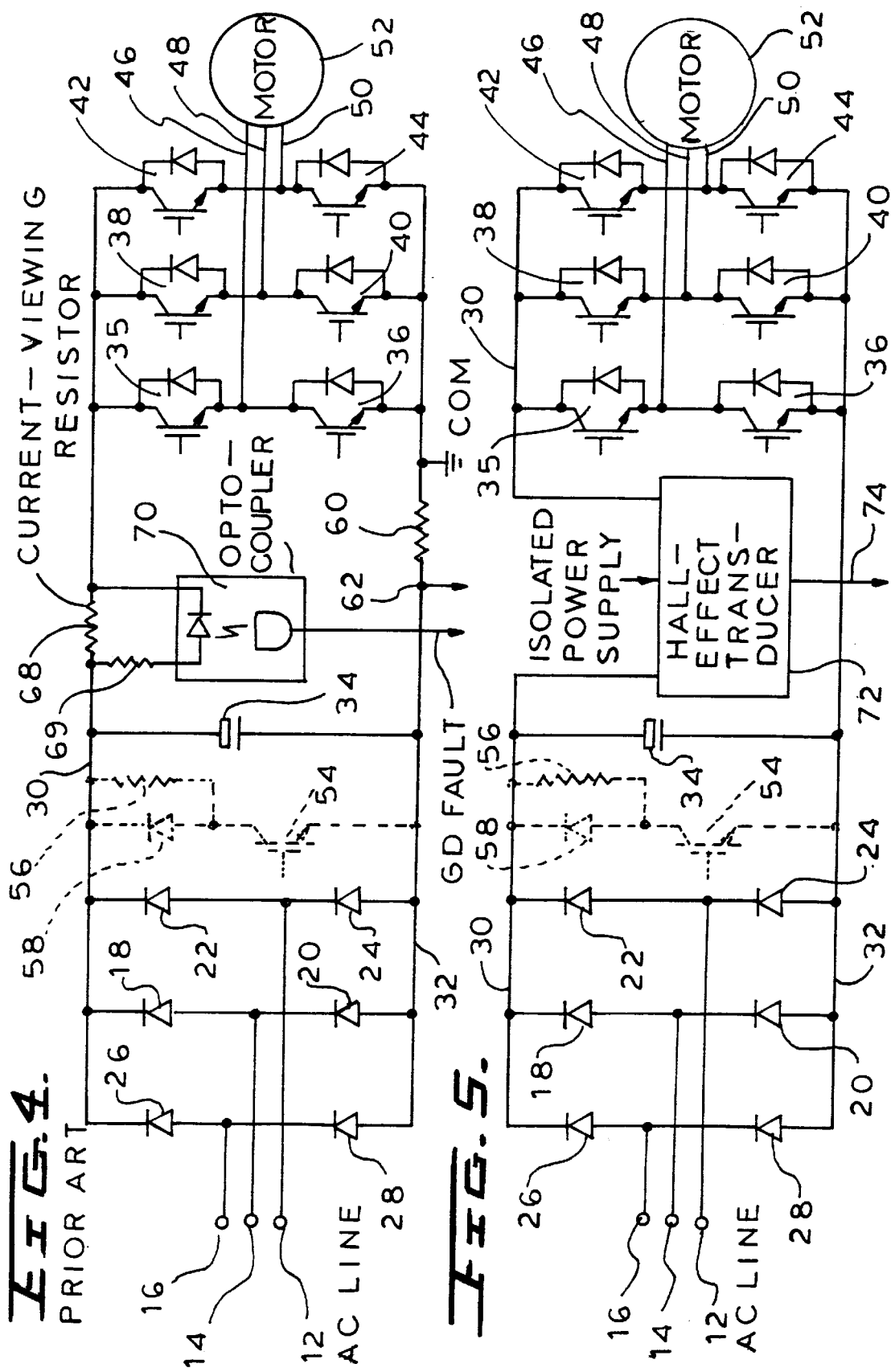

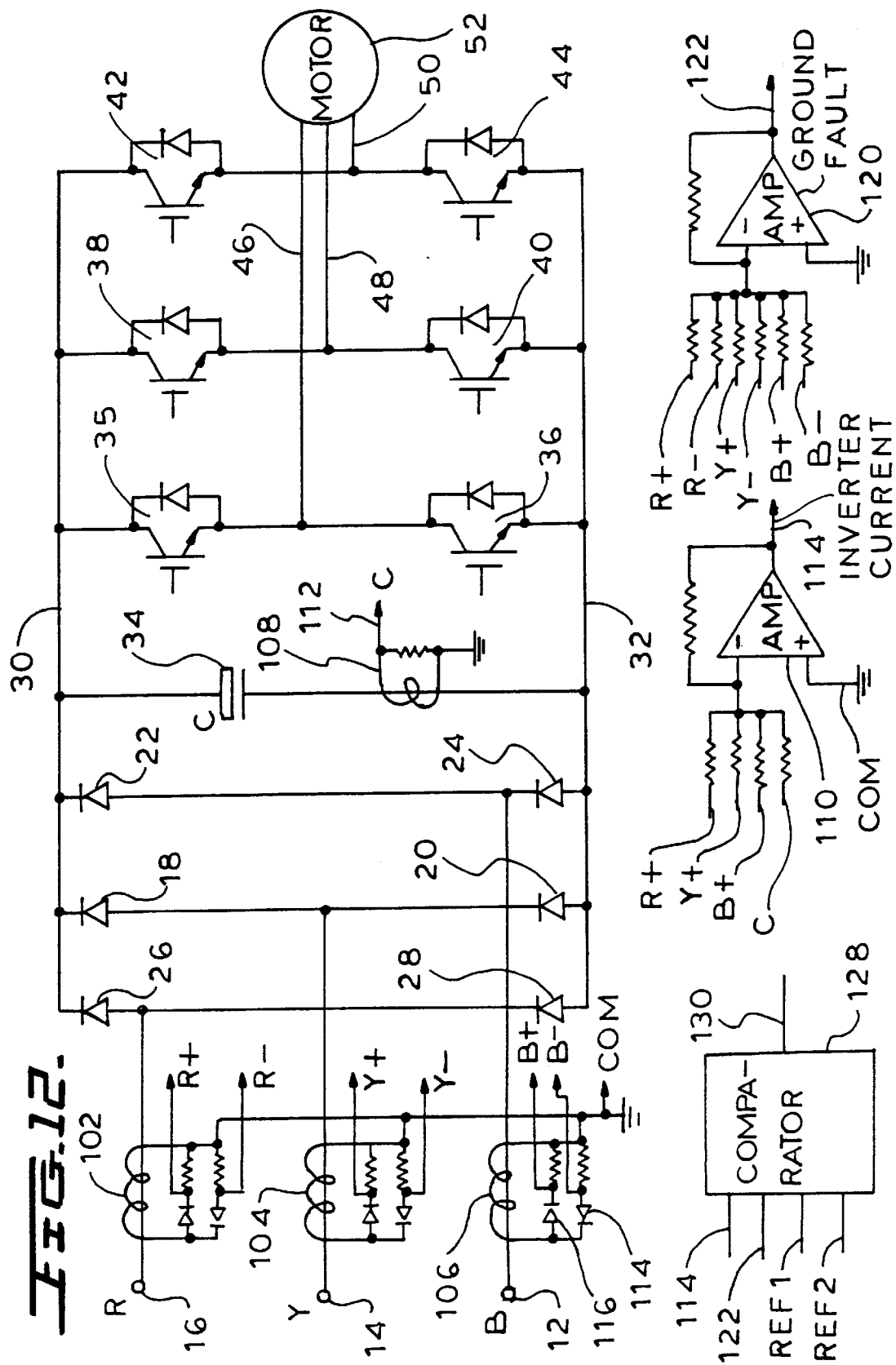

CIRCUIT FOR SENSING CURRENT IN POWER TRAINS FOR MOTOR CONTROL

CROSS REFERENCE TO RELATED APPLICATION

Under the provisions of 35 U.S.C. §120, this application claims priority to related U.S. Provisional Application No. 60/010,217, filed Jan. 18, 1996 and entitled CIRCUIT FOR SENSING CURRENT IN POWER TRAINS FOR MOTOR CONTROL.

BACKGROUND OF THE INVENTION

The present invention relates generally to sensing output current of any rectifier circuit with a capacitor output filter and, more particularly, to improvements in circuitry for sensing the current in a motor control drive circuit for effecting current limiting and obtaining improved short circuit protection.

A conventional, basic motor control circuit 10 illustrated in prior art FIG. 1 receives ac line input power 12, 14 and 16 and converts them to output drive power 46, 48 and 50 for the motor 52. In well known manner, the diodes 18, 20, 22, 24, 26 and 28 rectify the ac line voltage to produce a dc rail voltage which exists between the positive dc bus line 30 and the negative dc bus line 32. This rectified dc voltage is filtered and smoothed by a capacitor 34.

The power switching transistors 35, 36, 38, 40, 42 and 44 comprise a pulse with modulated (PWM) inverter which responds to a control circuit (not shown) which drives the gates of these transistors to produce the aforementioned motor drive signals 46, 48 and 50.

The inverter dc line current generally requires sensing to provide the following four functions:

1) Regulation of normal operating current;
2) Current limiting;
3) Line-to-line short circuit protection at the outputs; and
4) Output line-to-ground fault protection.

With the advent of smaller, more cost-effective power-train layouts incorporating surface-mount IGBTs, the need arises for more compact and more cost-effective ways of deriving the required current feedback signals.

In one known solution, a current-viewing resistor 60 is connected in series with the negative dc bus line 32 of the inverter, as shown in FIG. 2. The current signal at node 62 serves functions 1 through 3 above. The value of the current viewing resistor 60 typically is set so that it develops 500 mV–1000 mV at maximum operating current. The resulting power loss, for maximum operating currents of 10 to 15 amps, is tolerable. At higher currents, however, the power loss in the current-viewing resistor 60 becomes impractical.

The operating current could theoretically be increased by choosing the resistance of the current-viewing resistor 60 so that it develops 100 mV to 200 mV at full operating current, thus keeping the power loss to a tolerable level. A severe practical problem, though, is that the L/R (inductance to resistance) ratio of the current-viewing resistor increases as R decreases. This produces unacceptable distortion of the current signal, because of the high di/dt (rate of current change) of the inverter current. The problem is compounded as operating current increases, because both di/dt and the L/R ratio simultaneously increase.

FIG. 3 shows a comparison of the current signal waveform 64 from a commercially available "low inductance" 5 mΩ current-viewing resistor, versus the "real" waveform 66 of current. The distortion produced by the current-viewing resistor renders the signal unusable.

In another known solution, function 4 above can be satisfied with a current-viewing resistor 68, a limiting resistor 69 and an opto-coupler 70 in the positive dc bus 30, as shown in FIG. 4. The current-viewing resistor 68 must develop at least 1.0 V to activate the optocoupler 70. This is acceptable for operating currents of up to about 15 amps. At higher currents, the losses in the current-viewing resistor 68 become prohibitive.

Another common solution is to use a current transducer that employs a Hall-effect current sensor 72 in the dc bus 30, as shown in FIG. 5. The Hall-effect current transducer 72 is able to transmit dc, and delivers an isolated current signal 74 which is an acceptable replica of the actual inverter current.

The disadvantages of a Hall-effect current transducer are its relatively high cost (about $10–$15) and size. A typical 50A Hall-effect transducer which would be suitable for a 10hp drive is an LA 50-5 Hall-effect transducer available from LEM S.A. of Switzerland. The overall outline of the above transducer is approximately 1.6"×0.7"×1" high, for a total volume of 1.1 cubic inches.

In accordance with still another solution, a Hall-effect transducer can be modified to provide function 4 by using separate primary windings 78, 80 in the upper and lower dc buses respectively, as shown in FIG. 6. The two primaries 78, 80 buck each other, and have different number of turns. For example, if the upper winding 78 has three turns, and the lower winding 80 two turns, then there is one total effective primary turn for normal operation, two for a lower ground fault, and three for an upper ground fault. Logic circuitry (not shown) detects when an upper or lower ground fault occurs.

Again, the disadvantages of this solution are size and cost.

SUMMARY OF THE INVENTION

Accordingly, a key object of the present invention is to provide a circuit for sensing current in power trains for motors which is smaller in size and less costly.

A further object of the invention is to provide a current sensing circuit for motor control power trains which produces a reliable indication of current used in the circuit to enable, among other things, providing current limiting, short circuit protection and line-to-ground fault protection.

The present invention advantageously overcomes the deficiencies of the prior art noted above by providing a circuit for driving the inverter current signal in a motor drive power train using a simple low cost ac current transformer and/or a low cost current-viewing resistor, with non-critical inductance characteristics.

The circuit of the present invention is more compatible with compact next-generation drive trains than conventional Hall-effect transducers, and is more compact and less expensive than conventional Hall-effect transducers.

In accordance with one embodiment of the present invention, the motor driving circuit of the present invention includes a conventional rectifier bridge for producing a positive bus voltage and a negative bus voltage. A filtering and smoothing device, for example a capacitor, is connected in series between the dc buses and a plurality of power transistors are similarly connected between the positive and negative buses, in parallel to the dc capacitor. The transistors provide an output to a load such as the motor.

A novel current sensing circuit of the present invention includes a current-view sensing resistor connected in series in the negative bus to sense the rectifier current and a current transformer connected in series with the smoothing capacitor. The current transformer senses the capacitor current and is referenced to the current-view sensing resistor so as to produce a composite signal which provides an indication of current which can then be used for a variety of purposes. These include regulation of normal operating current, current limiting, output line-to-line short circuit protection and output line-to-ground fault protection.

Other features and advantages of the present invention will become apparent from the following description of the invention which refers to the accompanying drawings.

BRIEF DESCRIPTION OF THE DRAWINGS

FIG. 1 shows a basic prior art power train for an ac motor drive.

FIG. 2 shows a conventional circuit for obtaining the inverter current using a current-viewing resistor.

FIG. 3 is a comparison of the signals from a current transformer (CT) and a current-viewing resistor.

FIG. 4 shows a circuit for detecting upper ground-fault current using a current viewing resistor and an opto-coupler.

FIG. 5 shows a prior art circuit for obtaining the inverter current using a Hall-effect transducer.

FIG. 12 shows a third embodiment of the invention which provides ground fault sensing.

DETAILED DESCRIPTION OF THE PREFERRED EMBODIMENTS

The key to the circuit of the present invention is the recognition of the following fundamentals:

a) Total inverter current is the sum of capacitor current and rectifier output current.

b) Capacitor current is inherently ac; thus a simple low cost ac current transformer can be used to sense capacitor current.

c) Inductive distortion spikes on the output of a simple ac current transformer that senses the capacitor current are not severe. This is because the secondary current is 1/N×the primary current (N=secondary to primary turns ratio. Normally the primary would have one turn).

The secondary current-viewing resistor therefore can have a relatively high value, with a corresponding low L/R ratio. A standard 1/4W carbon resistor delivers an acceptable signal with low power dissipation.

Figure 6:
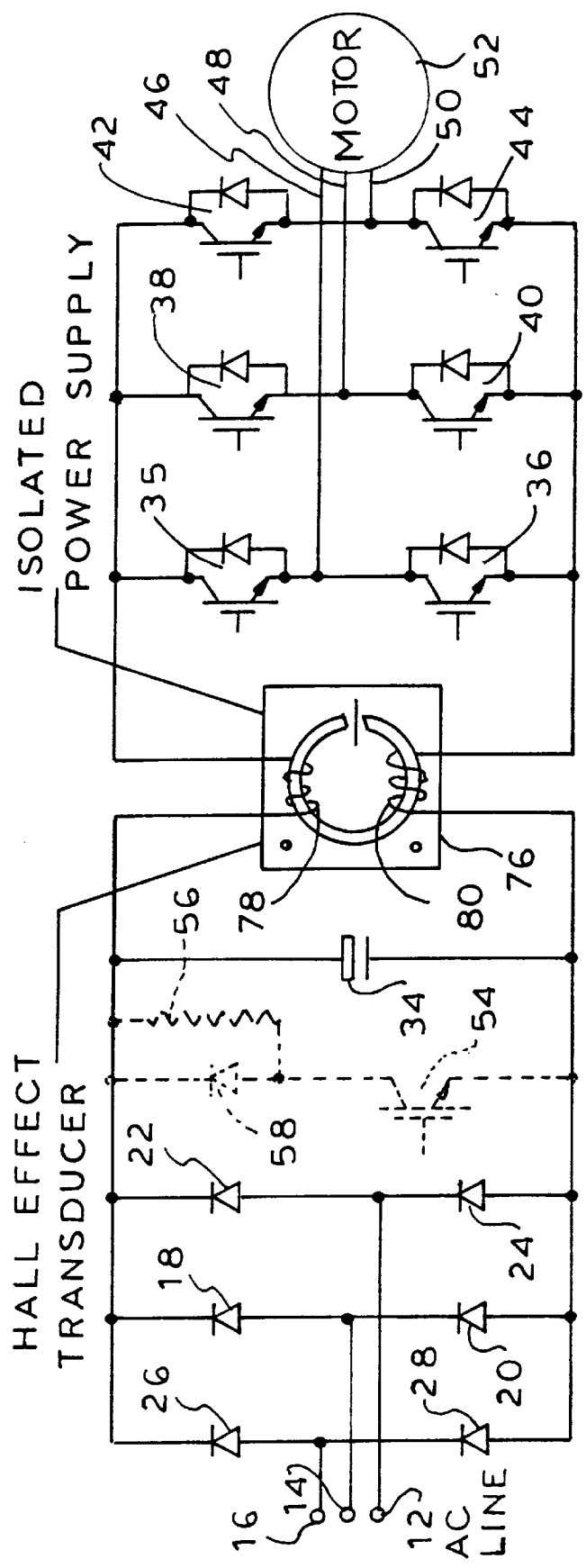
FIG. 6 shows a circuit using two primary windings with unequal turns on the Hall-effect transducer to detect a ground-fault condition.
Figure 8:
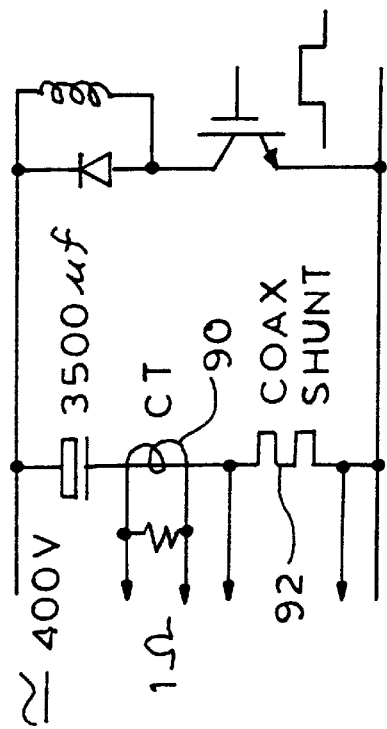
FIG. 8 shows a circuit including a current transformer and a coax shunt.
Figure 7A:
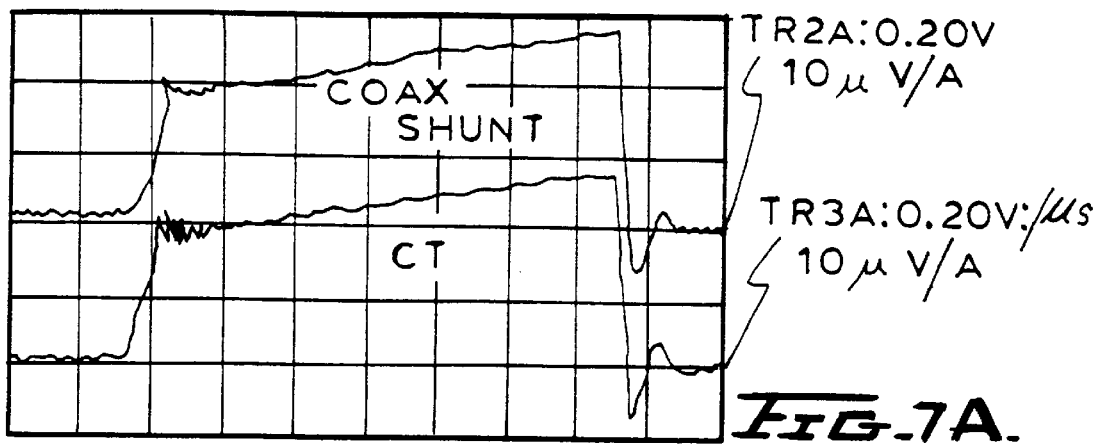
FIGS. 7A–7C present a comparison of the signals from a current transformer that measures capacitor current and a coax current-viewing shunt.
Figure 7B:
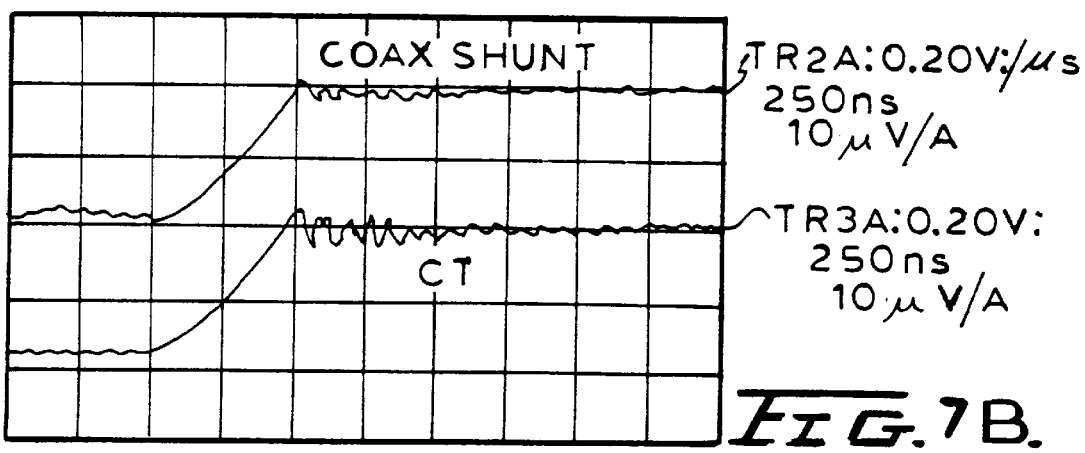
Figure 7C:
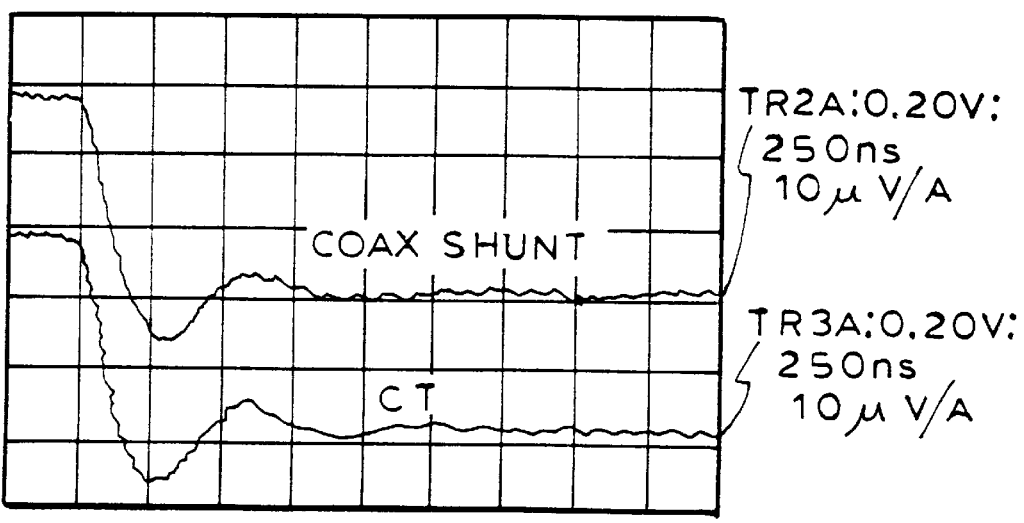

FIG. 7 compares the signal from a current transformer that measures capacitor current with that obtained from a high quality (but prohibitively priced and bulky) coaxial current-viewing shunt 92. See FIG. 8 for the test circuit containing coax shunt 92 and the current transformer 90. The two signals are virtually identical, demonstrating the high quality of the current transformer signal.

d) High di/dt inverter current—the cause of inductive distortion spikes with a current viewing resistor—flows only in the reservoir capacitor. High di/dt current cannot flow from the rectifier, because the impedance of the ac line precludes this. Thus, a conventional low resistance current-viewing resistor for which inductance is not critical can be used to sense the rectifier output current, without generating L di/dt voltage spikes.

Figure 9:
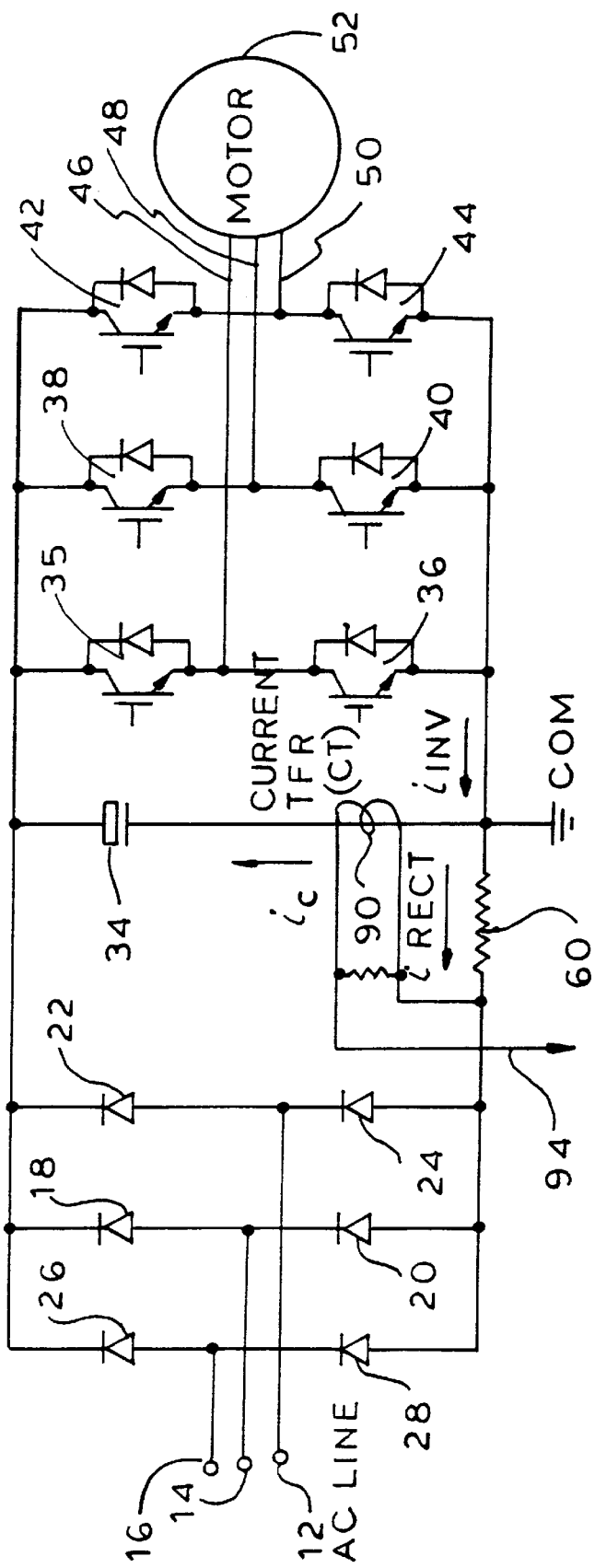
FIG. 9 shows a first embodiment of the present invention.

Referring to FIG. 9, a first embodiment of the invention is shown, in which a simple low cost, low loss ac current transformer 90 is combined with a low cost, low loss current-viewing resistor 60 (as explained above, the L/R ratio is not critical), to give a combined high fidelity signal. The current transformer 90 senses the capacitor current, and the current-viewing resistor senses the rectifier output current. The signals from the current transformer and current viewing resistor are added, yielding a composite distortion-free signal at terminal 94 that represents the total inverter current.

The cost of the current transformer 90 and current-viewing resistor 60, suitable for a 10 hp drive, is around $2.00, as compared to about $10 to $15 for a Hall effect transducer. The outside diameter of the current transformer 90 is ⅝ to ⅞ inches, and volume of the current transformer (for ⅞ diameter) is about 0.15 cu. inch. The volume of the current-viewing resistor 60 is about 0.1 cu. inch, for a total volume for the two components of 0.25 cu. inches—compared with 1.1 cu. inches for a Hall-effect transducer. (Note that if the current transformer is fitted directly around the capacitor terminal, the volume occupied by this component is almost negligible).

The embodiment of the present invention described above provides a signal that represents the inverter current during normal motor operation. Current in a braking circuit comprising elements 54, 56, 58, such as shown in FIG. 1, is not sensed. The brake circuit current has high di/dt and a dc component. Therefore it is not suitable for sensing by a low resistance current-viewing resistor, nor by a simple current transformer.

Figure 10:
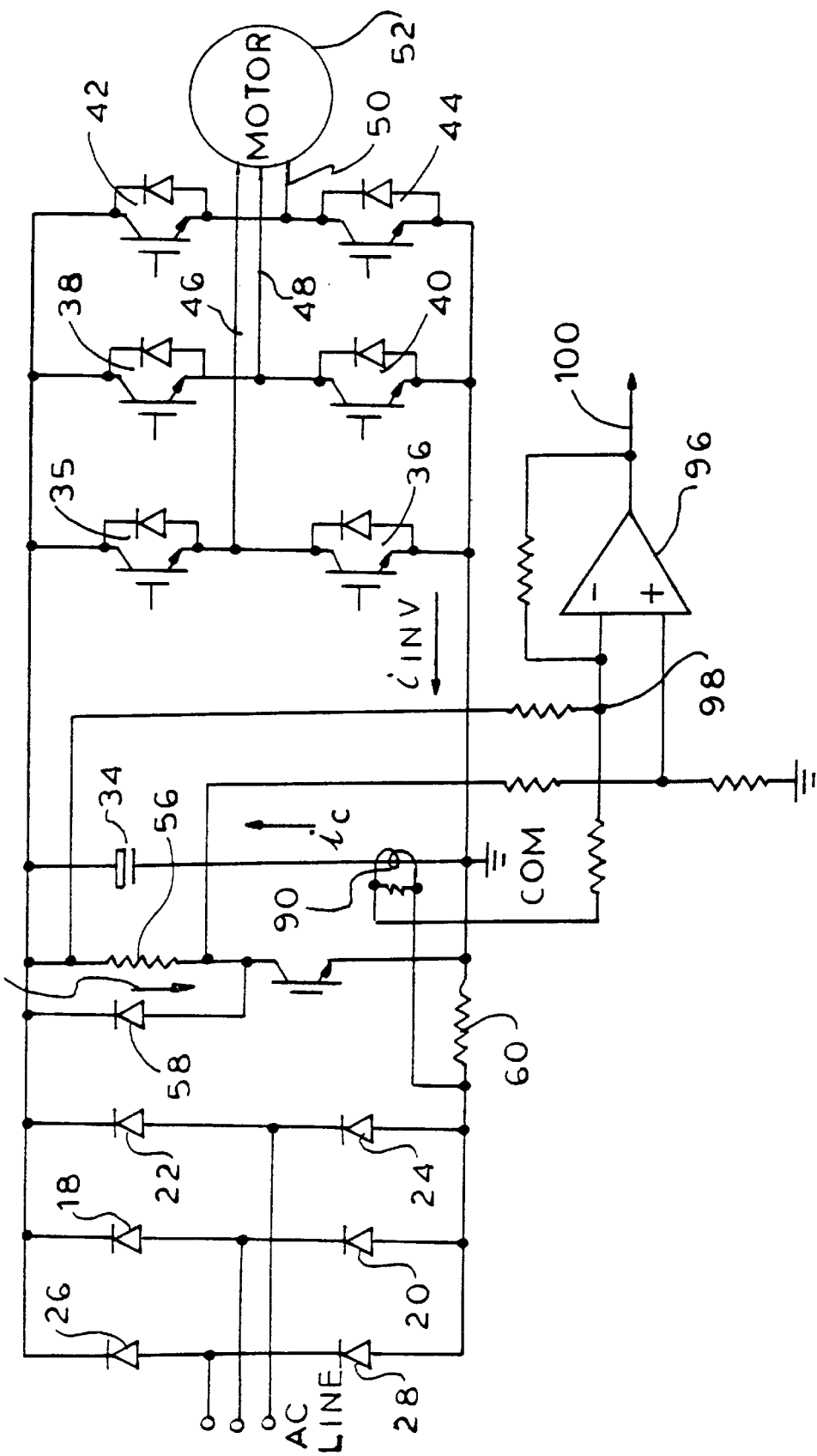
FIG. 10 shows a second embodiment of the present invention.

A second embodiment of the invention, shown in FIG. 10, uses the resistor 56 of the braking circuit itself—which has a relatively high resistance and low L/R ratio—to provide an adequate enough current-sensing function for the brake circuit. Referring to FIG. 10, the voltage across the braking resistor 56 is sensed by a differential amplifier 96, and the signal is added to the combined capacitor and rectifier current signal at the terminal 98. The output 100 of the amplifier represents the total inverter current, both for the motoring and braking modes of operation.

Figure 11A:
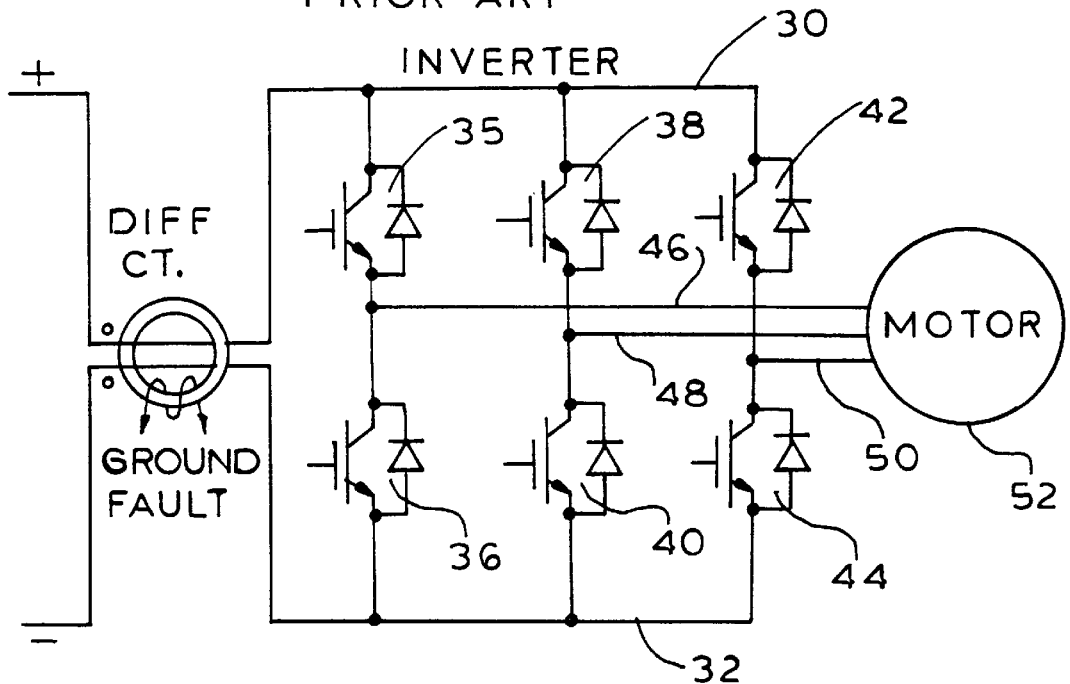
FIGS. 11(*a*) and 11(*b*) show a prior art method for providing ground fault sensing at the high side of an invertor.
Figure 11B:
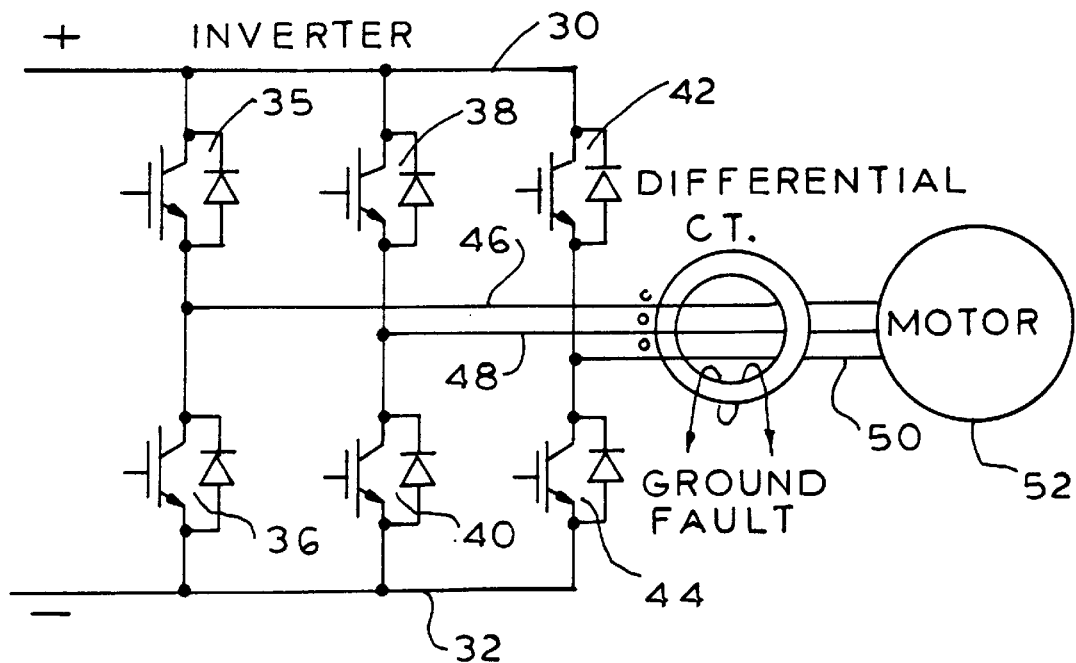

The first and second embodiments of the invention do not provide ground fault current sensing at the high side of the inverter 10. One known method for providing this function is to connect a differential current transformer in the upper and lower dc buses as shown in FIG. 11*a*, or in the ac outputs of the inverter, as shown in FIG. 11*b*. In normal operation, the output of the differential transformer is zero. Ground fault current produces a net flux in the core of the differential transformer, and a corresponding voltage at the secondary, which is indicative of a ground fault.

FIG. 12 shows a third embodiment of the invention which provides ground fault current sensing. Simple low cost ac current transformers 102, 104, 106 are connected in the ac input lines 12, 14, 16, and a simple ac current transformer 108 senses the capacitor 34 current. The ac line current transformers 102, 104, 106 serve the dual functions of providing a signal that represents the rectifier output current, thus eliminating the need for a current-viewing resistor at the output of the rectifier, and of delivering a signal that indicates a ground fault.

The rectifier output current signal is constructed by summing in amplifier 110 the positive portions of each ac line current transformer signal. Amplifier 110 also sums the capacitor current transformer signal 110 (or C), and its output signal 114 thus represents the total inverter current.

Note that the circuit shown in FIG. 12, which separates the positive portions of the current transformer signals with individual rectifiers 114, 116, is diagrammatic. Alternatively, electronic separation of the positive signals within the amplifier itself may be preferred in an actual implementation, as would be apparent to those of skill in the art.

The three line current signals, (positive and negative portions, e.g., the signals R+, R−, Y+, Y−, B+ and B−), are also summed by amplifier 120. In normal operation, the sum of these signals—hence also the output of amplifier 120—is zero. If a ground fault occurs, the three line input currents no longer sum to zero, and Amplifier 120 delivers an output 122, indicating a ground fault.

Thus, the amplifier 110 produces an inverter current signal 114 which is indicative of both the power flowing from the line as well as in the capacitor 34. Therefore, in the event of a line-to-line output shortage, the inverter current sensing circuit will rapidly detect the surge of current flowing in the capacitor 34 to enable quick shutdown of the overall inverter circuit. The current sensing circuit is not slowed down by the very high inductance of the ac source. The device 120 is employed for sensing ground fault currents, as explained above.

As is well known, the invention may include a comparator 128 which compares either the inverter current signal 114 and/or the ground fault indication signal 122 to reference signals, e.g. REF1, REF2, to produce an output 130 which could serve to shut down the inverter in the event of either overcurrent or ground fault conditions.

The estimated total cost of the circuit of FIG. 12 for a 10 hp drive is about $4.50, versus $10 to $15 for a Hall-effect current transducer. The estimated total volume is 0.35 cu. inches, versus 1.1 cu. inches for the Hall-effect device. The advantage of the embodiment of FIG. 12.—versus a current viewing resistor—is that it provides a fully isolated current signal, and it is virtually lossless.

In summary, the present invention, as shown in FIGS. 9, 10 and 12, derives the inverter current signal in a motor drive power train using a simple low cost ac current transformers and a low cost current/viewing resistor or further low cost ac current transformers, with non-critical inductance characteristics. The invention is more compatible with compact next generation drive trains than conventional Hall-effect transducers. Additionally, the cost and size of the circuitry of the present invention is significantly less than for a conventional Hall-effect transducer.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A driving circuit for driving a load, the driving circuit comprising:
   a dc source voltage supplied between a positive bus and a negative bus;
   a filter connected between the positive bus and the negative bus;
   a plurality of power transistors connected between the positive and the negative buses, and in parallel to the filter;
   a braking circuit including a braking resistor coupled between the positive and negative buses;
   a current sensing circuit including a current-view sensing resistor connected in series in the negative bus to produce a signal representative of a current flowing in the negative bus, and a current transformer coupled to and located to sense current in the filter, the current transformer being connected to sense the filter current, the current-view sensing resistor producing together with the current transformer a control signal indicative of inverter current; and
   a summing circuit operable to combine the signal indicative of the filter current with a braking current signal taken from the braking resistor in an additive fashion.

2. The driving circuit of claim 1, in which the filter is a capacitor.

3. The driving circuit of claim 2, in which the capacitor has a first terminal which is connected to a common node of the driving circuit, the current-view sensing resistor has a first terminal connected to the common node and a second terminal which is connected to the current transformer and the current transformer has a terminal which supplies the signal indicative of inverter current.

4. The driving circuit of claim 3, in which the resistor has a non-critical inductance.

5. The driving circuit of claim 1, in which the braking resistor has a high R/L ratio.

6. The driving circuit of claim 1, in which the summing means comprises an operational amplifier which sums the signal indicative of capacitor current with current within the negative bus current with the braking current signal to produce a total current signal which is indicative of a motoring and a braking current.

7. The driving circuit of claim 1, further comprising a single or poly phase power input and a diode rectifier bridge to rectify the power input into the dc source voltage supplied at the positive bus and the negative bus.

8. The driving circuit of claim 1, in which the load is a motor.

9. The driving circuit of claim 1, in which the volume occupied by the current-view resistor and the current transformer is not greater than about 0.35 cubic-inches.

10. The driving circuit of claim 1, further comprising at least one ac input line and an associated voltage rectifying bridge for supplying the dc source voltage between the positive bus and the negative bus;
    the current sensing circuit further including at least one current transformer coupled to and located to produce a signal representative of a current flowing in the at least one ac input line; and
    the summing circuit being operable to combine the output from the at least one current transformer with the filter current and the braking current signal.

11. The driving inverter circuit of claim 10, in which the at least one ac input line comprises three ac input lines and including a respective current transformer associated with each of the three ac input lines, with each of the three current transformers being coupled to the summing circuit.

12. The driving circuit of claim 11, in which each of the current transformers associated with the ac input line delivers a positive current output and a negative current output and the positive current output is connected to the summing circuit.

13. The driving circuit of claim 10,
wherein the at least one current transformer delivers a positive current output and a negative output current, the summing circuit including a fault current circuit for summing the positive current output and the negative current output of the at least one current transformer for producing a fault current indicating signal.

14. The driving circuit of claim 13 in which the at least one ac input line comprises three ac input lines and including a respective current transformer associated with each of the three ac input lines with each of the current transformers delivering said positive current output and said negative current output and each of said positive current output and said negative current output being coupled to said fault current summing circuit.

15. The driving circuit of claim 12, further comprising a fault current summing circuit with each of said positive current output and said negative current output being connected to said fault current summing circuit for enabling said fault current summing circuit to produce a signal indicative of a fault current condition.

* * * * *